United States Patent
Ghare et al.

(10) Patent No.: US 10,599,478 B1
(45) Date of Patent: Mar. 24, 2020

(54) AUTOMATED RECONFIGURATION OF REAL TIME DATA STREAM PROCESSING

(71) Applicant: Amazon Technologies, Inc., Seattle, WA (US)

(72) Inventors: Gaurav D. Ghare, Seattle, WA (US); Roger Barga, Woodinville, WA (US)

(73) Assignee: Amazon Technologies, Inc., Seattle, WA (US)

( * ) Notice: Subject to any disclaimer, the term of this patent is extended or adjusted under 35 U.S.C. 154(b) by 88 days.

(21) Appl. No.: 15/084,350

(22) Filed: Mar. 29, 2016

(51) Int. Cl.
*G06F 9/50* (2006.01)
*G06F 16/2455* (2019.01)

(52) U.S. Cl.
CPC ........ *G06F 9/505* (2013.01); *G06F 16/24568* (2019.01)

(58) Field of Classification Search
CPC ....................................................... G06F 9/505
See application file for complete search history.

(56) References Cited

U.S. PATENT DOCUMENTS

| | | | |
|---|---|---|---|
| 7,613,848 B2 | 11/2009 | Amini et al. | |
| 9,122,726 B2 | 9/2015 | Branson et al. | |
| 9,195,559 B2 | 11/2015 | Branson et al. | |
| 9,379,950 B2 | 6/2016 | Bragstad et al. | |
| 2009/0319687 A1* | 12/2009 | Goldstein | G06F 9/5083 709/241 |
| 2009/0328054 A1* | 12/2009 | Paramasivam | G06F 9/5033 718/105 |
| 2011/0314019 A1 | 12/2011 | Jimenez Pens et al. | |
| 2013/0054779 A1 | 2/2013 | Cradick et al. | |
| 2013/0091266 A1* | 4/2013 | Bhave | G06F 11/3476 709/224 |
| 2013/0198489 A1 | 8/2013 | Branson et al. | |
| 2014/0047341 A1* | 2/2014 | Breternitz | G06F 9/505 715/735 |

OTHER PUBLICATIONS

Virtualization, Bosch, Greg, 2010, Lehigh University.*

* cited by examiner

*Primary Examiner* — Charlie Sun
(74) *Attorney, Agent, or Firm* — Robert C. Kowert; Kowert, Hood, Munyon, Rankin & Goetzel, P.C.

(57) ABSTRACT

Automated reconfiguration of real time data stream processing may be implemented. A processing function that describes one or more operations to be performed with respect to one or more data streams may be executed at one or more processing nodes. Performance metrics describing the performance of the processing function at the processing nodes may be collected and monitored. A reconfiguration event may be detected for the processing function. A different execution configuration for the processing function may be determined and initiated in response to detecting the reconfiguration event.

20 Claims, 9 Drawing Sheets

AUTOMATED RECONFIGURATION OF REAL TIME DATA STREAM PROCESSING

BACKGROUND

Interconnected devices, such as networked sensors and computing devices, can generate and send data pertinent to various operations, transactions, or other events to remote devices for storage and further analysis. For example, mobile phones can generate data indicating their locations, the applications being used by the phone users, and so on, at least some of which can be collected and analyzed in order to present customized coupons, advertisements and the like to the users. The analysis of data collected by surveillance cameras may be useful in preventing and/or solving crimes, and data collected from sensors embedded at various location within airplane engines, automobiles or complex machinery may be used for various purposes such as preventive maintenance, improving efficiency and lowering costs.

As a result of utilizing interconnected devices, large amounts of data may be generated and sent in streaming fashion so that the data can be captured in real time. However, over time the volume of streaming data may prove difficult to efficiently analyze. Different data formats for data records within data streams could require different operations to be performed in order to interpret or manipulate the data, making it difficult to utilize a common schema to handle multiple data streams. The volume of data within a data stream may change over time, complicating efforts to acquire the appropriate number of resources for efficiently analyzing the data stream.

Figure 1:
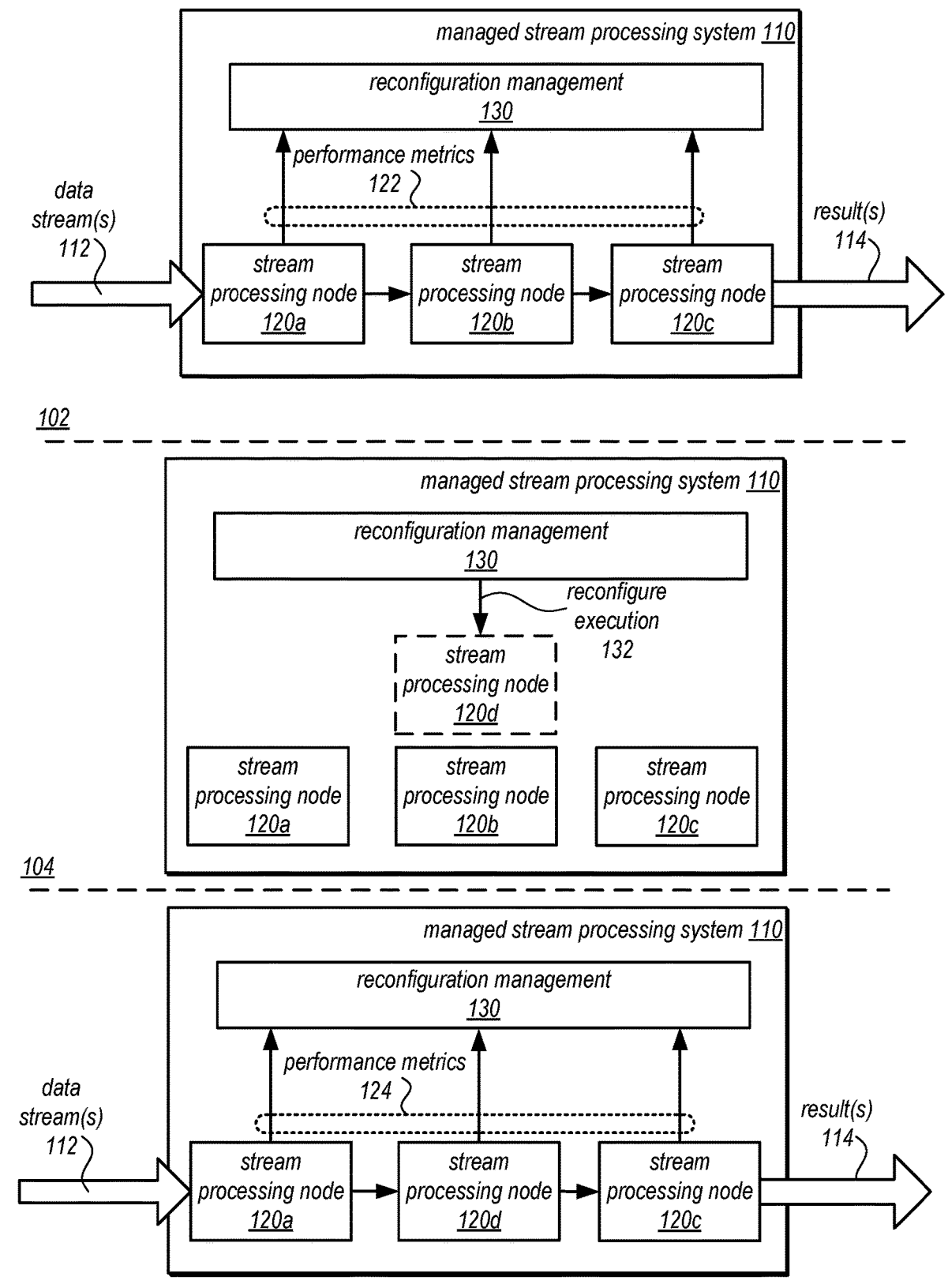
FIG. 1 is a logical block diagram that illustrates automated reconfiguration of real time data stream processing, according to at least some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION

Various embodiments of methods and apparatus to implement automated reconfiguration of real time data stream processing are described. The term "data stream", as used herein, refers to a sequence of data records that may be generated by one or more data producers and accessed by one or more data consumers, where each data record is assumed to be an immutable sequence of bytes representing one or more attributes. The records of a stream may also be referred to as observation records, observations, points, or data records herein, and the data producers may be referred to as streaming data sources. A managed stream processing system may provide programmatic interfaces (e.g., application programming interfaces (APIs), web pages or web sites, graphical user interfaces, or command-line tools) to execute functions specified via the programmatic interfaces (or selected via the programmatic interfaces) in various ways and direct the reporting of processing results to one or more destinations.

Stream processing functions may be specified according to standard programming languages or specifications, such as structure query language (SQL), custom programming or a numerical computation language like Matlab, domain specific languages (which may be defined and implemented by a managed stream processing system), or input forms or other interface elements (e.g., a function generation wizard) which provide a user with the ability to select input data streams, function operations (e.g., aggregation, filtering, statistical operations, etc.), and result destinations. A managed stream processing system may handle connecting or interfacing with input data streams, selecting or provisioning the appropriate stream processing nodes (or other processing resources) which may execute the specified stream processing function (e.g., implementing the appropriate execution engines, such as a storage engine that interprets SQL statements), and reporting results to result destinations. In this way, the managed stream processing system may allow users to connect, parse, and apply a real time schema on raw data streams.

Executing stream processing functions at the managed stream processing system may provide users with capability to quickly build real time computations including data filters, transformations, and aggregations without burdening users with the additional time to manually managing the resources to carry out the specified stream processing function. Moreover a managed stream processing system may offer a library of predefined stream processing functions which may be customized to build various stream processing applications, including business-critical streaming applications like real time traffic congestion analysis, emergency call monitoring, fraud detection, and industrial sensor analytics. As part of managing and executing stream processing functions, automated reconfiguration of the execution of such functions may be performed by a managed stream processing system. In this way, users may be unaware of changes made to improve the performance, efficiency, or cost of executing processing functions and/or may be relieved of the burden of having to manually monitor and tune processing function performance.

FIG. 1 is a logical block diagram that illustrates automated reconfiguration of real time data stream processing, according to at least some embodiments. Clients of managed stream processing 110 may provide stream processing functions to managed stream processing system 110. Managed stream processing system 110 may then implement stream processing provisioning and other management functions to execute the stream processing function on stream processing node(s) 120 so that as data records of data stream(s) 112 are received stream processing node(s) 120 may apply the stream processing function and provide result(s) 114 to a specified result destination.

Clients may specify a stream processing function to implement different applications. For example, clients may include an operation in the stream processing function that selects certain attributes and then specify operation(s) that perform specific processing on the selected attribute (e.g., filtering out the attributes, validating the values of the attributes against known patterns, performing time series analytics). Key performance indicators (KPI) are one example of data attributes which may be extracted from a data stream for performing such operations. Clients may utilize a stream processing function to perform stream pattern generation so that real time alerts may be triggered when detecting certain events from data stream records or so that additional data may be inserted to enrich the data conveyed in data records of a data stream. Moreover, clients may specify stream processing functions that process across multiple data streams in order to perform complex stream processing (e.g., analyzing temporal patterns between streaming events in different streams). Stream processing records may be provided to managed stream processing system 110 complete and ready for execution (e.g., identify input streams, operations, result destinations, and other information). In some embodiments, clients may configure the performance of the stream processing function (e.g., by providing a distribution scheme to map data from one or multiple input data streams to a distributed set of stream processing nodes applying a stream processing function).

Because clients may not implement the execution of the stream processing function manually, managed stream processing system 110 may implement reconfiguration management 130 to automatically determine when a reconfiguration of the stream processing node(s) 120 applying a stream processing function to data stream(s) 112 is appropriate. For instance, as illustrated in scene 102, in various embodiments, reconfiguration management 130 may collect or receive various performance metrics 122 from nodes 120a, 120b, 120c describing the performance of applying the streaming processing function at the nodes (including the performance of individual operations of the function). Performance metrics 122 (e.g., metrics that indicate processor utilization, network utilization, memory utilization, or any other computational performance metric for processing nodes or hosts upon which the nodes are implement, metrics that indicate the behavior of the data stream, rate of data records received, average size of data records, number of data records in processing buffer or queue, or metrics that are specific to the performance of individual operations such as average time to perform a query operation, filter operation, aggregation operation, statistical analysis, etc.) may be monitored, evaluated, or otherwise analyzed with respect to various reconfiguration event criteria (e.g., thresholds) to detect events that trigger a reconfiguration of the execution of the stream processing function at nodes 120.

When a reconfiguration event is detected, reconfiguration management may determine a different execution configuration (e.g., number of stream processing nodes, type of stream processing nodes, workload distribution, data stream mapping, etc.) which may solve, cure, or otherwise optimize the detected reconfiguration event (e.g., add more storage, memory, or processing capacity). For example, as illustrated in scene 104, reconfiguration management may provision a new stream processing node 120d as part of reconfiguration execution, which may be a different type of stream processing node for use in executing the stream processing function. Once the new execution configuration is determined and provisioned, reconfiguration management may initiate execution of the function according to the new execution configuration. For instance, as illustrated in scene 106, stream processing node 120d has replaced stream processing node 120b and processing of data streams 112, reporting of results 114 and performance metrics 124 has resumed. There are many different ways in which the reconfiguration operation may be performed without losing data records, such as utilizing execution state updated by stream processing nodes as discussed below with regard to FIGS. 4 and 8. Execution state may be maintained across multiple data streams (and/or partitions of data streams) processed by the stream processing function so that execution of the processing function may resume at the next data record to be processed in each data stream. In this way, different data streams may be processed at different rates, without interfering with processing of other data streams.

Please note that previous descriptions are not intended to be limiting, but are merely provided as a logical example of automatic reconfiguration of data stream processing in real time. Different numbers or combinations of components, systems, and/or devices may be utilized to execute stream processing functions on behalf of clients.

This specification begins with a general description of a provider network, which may implement a stream processing service that provides automatic reconfiguration of data stream processing in real time. Then various examples of a stream processing service are discussed, including different components/modules, or arrangements of components/module that may be employed as part of providing automatic reconfiguration of data stream processing in real time. A number of different methods and techniques to implement automatic reconfiguration of data stream processing in real time are then discussed, some of which are illustrated in accompanying flowcharts. Finally, a description of an example computing system upon which the various components, modules, systems, devices, and/or nodes may be implemented is provided. Various examples are provided throughout the specification.

Figure 2:
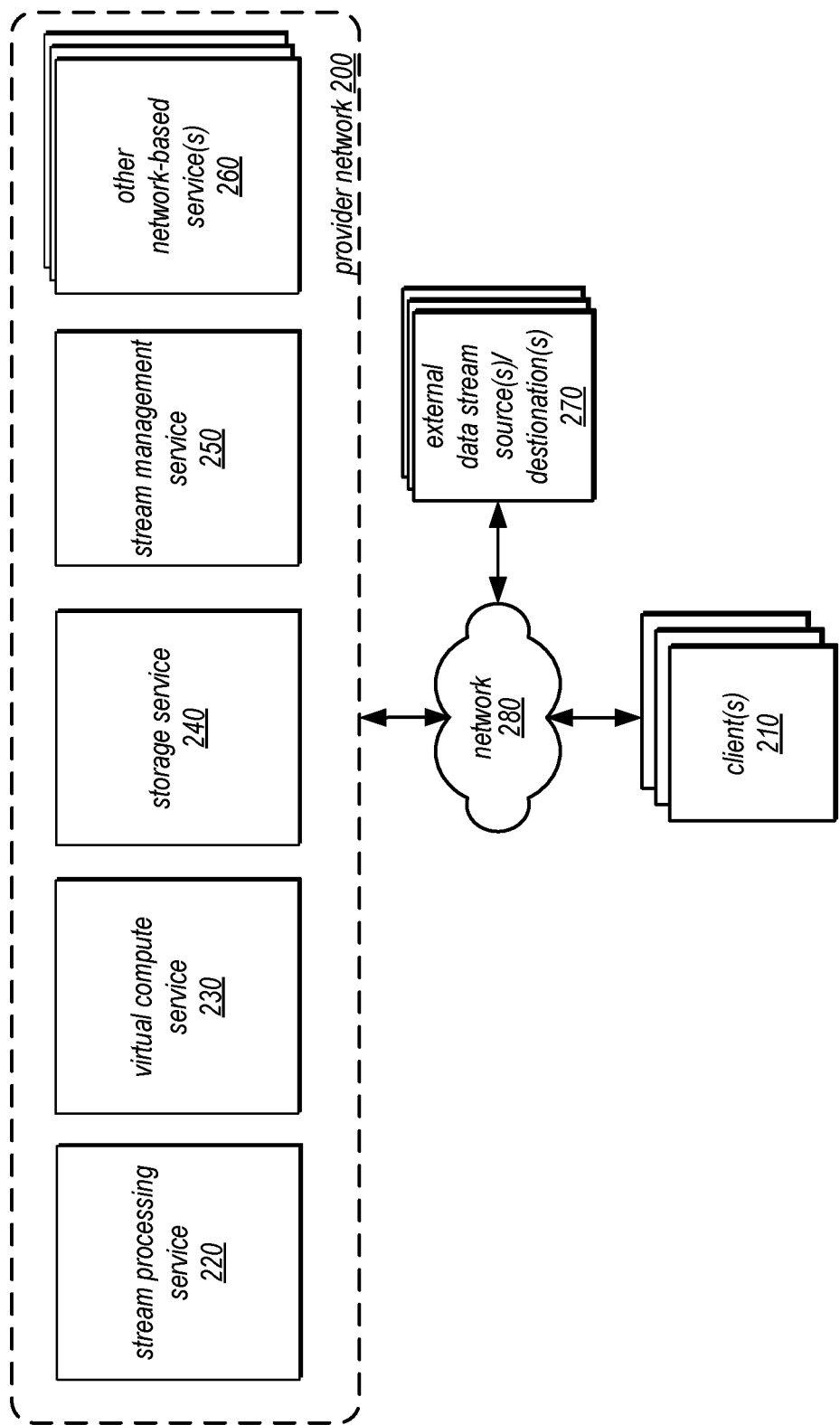
FIG. 2 is a logical block diagram illustrating a provider network that implements a stream processing service that provides automated reconfiguration of real time data stream processing, according to at least some embodiments.
Figure 3:
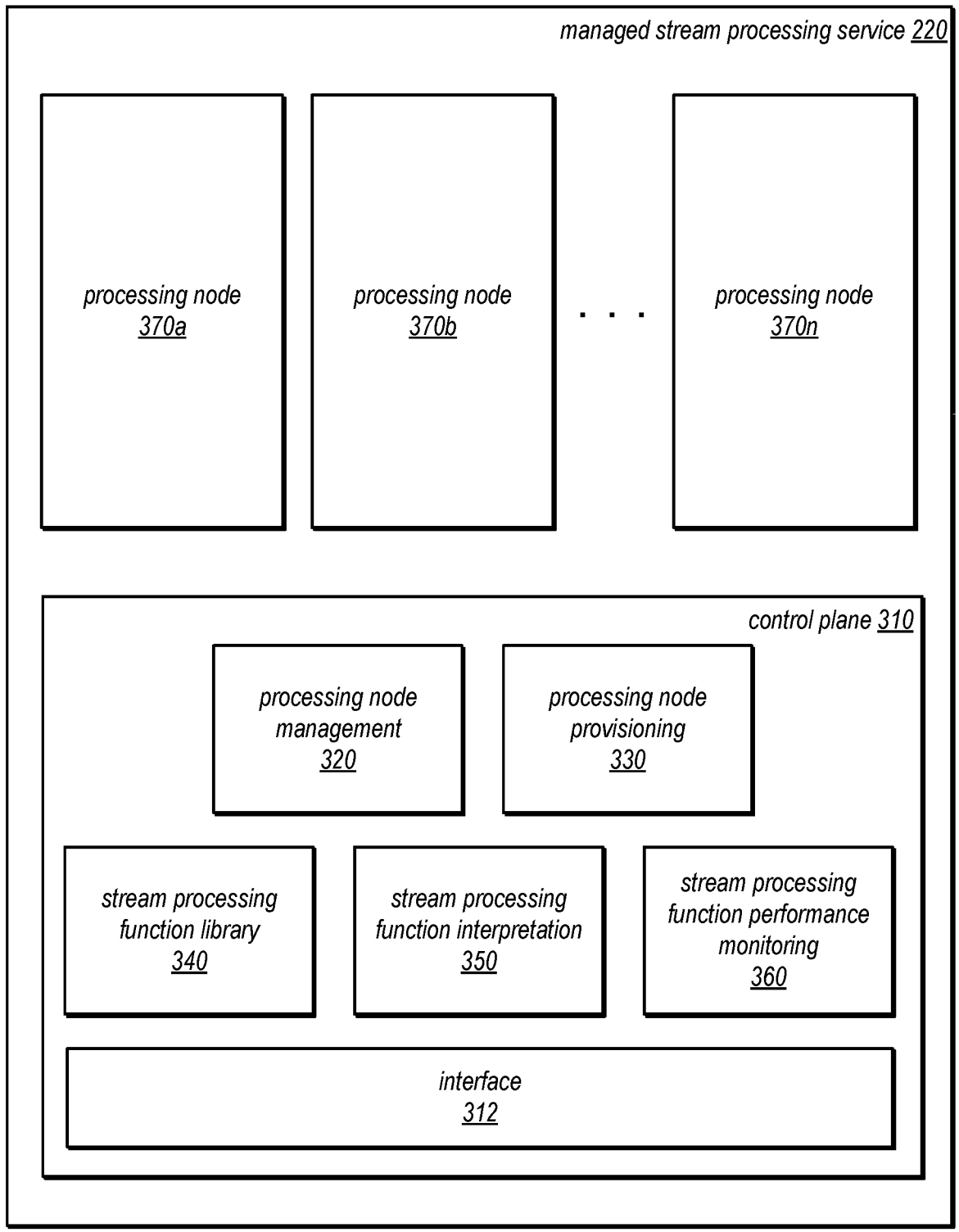
FIG. 3 is a logical block diagram of a stream processing service that implements automated reconfiguration of real time data stream processing, according to at least some embodiments.

FIG. 2 is a logical block diagram illustrating a provider network that implements a stream processing service that provides automated reconfiguration of real time data stream processing, according to at least some embodiments. Provider network 200 may be set up by an entity such as a company or a public sector organization to provide one or more services (such as various types of cloud-based computing or storage) accessible via the Internet and/or other networks to clients 210. Provider network 200 may include numerous data centers hosting various resource pools, such as collections of physical and/or virtualized computer servers, storage devices, networking equipment and the like (e.g., computing system 1000 described below with regard to FIG. 9), needed to implement and distribute the infrastructure and services offered by the provider network 200. In some embodiments, provider network 200 may implement a stream processing service 220, described in detail below with regard to FIG. 3, provide computing resources, such as virtual compute service 230 and storage services 240, such as object storage services, block-based storage services, data warehouse storage services, stream management service 250, and/or any other type of network based services 270 (which may include various other types of storage, processing, analysis, communication, event handling, visualization, and security services). Clients 210 may access these various services offered by provider network 200 via network 280. Likewise network-based services may themselves communicate and/or make use of one another to provide different services. For example, computing resources offered to clients 210 in units called "instances," such as virtual or physical compute instances or storage instances, may be implemented as data producers or data consumers for a data stream processed by stream processing service 220 and services such as storage service 240, may serve as destinations for data records in the data stream, providing virtual block storage for the compute instances.

As noted above, virtual compute service 230 may offer various compute instances to clients 210. A virtual compute instance may, for example, comprise one or more servers with a specified computational capacity (which may be specified by indicating the type and number of CPUs, the main memory size, and so on) and a specified software stack (e.g., a particular version of an operating system, which may in turn run on top of a hypervisor). A number of different types of computing devices may be used singly or in combination to implement the compute instances of virtual compute service 230 in different embodiments, including special purpose computer servers, storage devices, network devices and the like. In some embodiments instance clients 210 or other any other user may be configured (and/or authorized) to direct network traffic to a compute instance. In various embodiments, compute instances may attach or map to one or more data volumes provided by a block-based storage service (not illustrated) in order to obtain persistent block-based storage for performing various operations.

Compute instances may operate or implement a variety of different platforms, such as application server instances, Java™ virtual machines (JVMs), special-purpose operating systems, platforms that support various interpreted or compiled programming languages such as Ruby, Perl, Python, C, C++ and the like, or high-performance computing platforms) suitable for performing client applications, without for example requiring the client 210 to access an instance. In some embodiments, compute instances have different types or configurations based on expected uptime ratios. The uptime ratio of a particular compute instance may be defined as the ratio of the amount of time the instance is activated, to the total amount of time for which the instance is reserved. Uptime ratios may also be referred to as utilizations in some implementations. If a client expects to use a compute instance for a relatively small fraction of the time for which the instance is reserved (e.g., 30%-35% of a year-long reservation), the client may decide to reserve the instance as a Low Uptime Ratio instance, and pay a discounted hourly usage fee in accordance with the associated pricing policy. If the client expects to have a steady-state workload that requires an instance to be up most of the time, the client may reserve a High Uptime Ratio instance and potentially pay an even lower hourly usage fee, although in some embodiments the hourly fee may be charged for the entire duration of the reservation, regardless of the actual number of hours of use, in accordance with pricing policy. An option for Medium Uptime Ratio instances, with a corresponding pricing policy, may be supported in some embodiments as well, where the upfront costs and the per-hour costs fall between the corresponding High Uptime Ratio and Low Uptime Ratio costs.

Compute instance configurations may also include compute instances with a general or specific purpose, such as computational workloads for compute intensive applications (e.g., high-traffic web applications, ad serving, batch processing, video encoding, distributed analytics, high-energy physics, genome analysis, and computational fluid dynamics), graphics intensive workloads (e.g., game streaming, 3D application streaming, server-side graphics workloads, rendering, financial modeling, and engineering design), memory intensive workloads (e.g., high performance databases, distributed memory caches, in-memory analytics, genome assembly and analysis), and storage optimized workloads (e.g., data warehousing and cluster file systems). Size of compute instances, such as a particular number of virtual CPU cores, memory, cache, storage, as well as any other performance characteristic. Configurations of compute instances may also include their location, in a particular data center, availability zone, geographic, location, etc. . . . and (in the case of reserved compute instances) reservation term length.

Storage service 240 may include various types of storage services, such as different types of storage schemes. An object-based data store may be implemented, in various embodiments, to provide highly durable storage for data objects, such as data records stored as part of a data stream managed by stream management service 220. For instance, the object-based data store may be implemented as a key-value data store, where a data object is associated with a unique key. The key for the data object is used to access or manage the data object stored in the object-based data store. Storage service 240 may also include a data warehouse, in various embodiments, to set up, operate, and scale a data warehouse in a cloud computing environment. Data warehouse clusters hosted by the data warehouse may provide an enterprise-class database query and management system that allows users to scale the clusters, such as by sending a cluster scaling request to a cluster control interface implemented by the web-service. Scaling clusters may allow users of the web service to perform their data warehouse functions, such as fast querying capabilities over structured data, integration with various data loading and ETL (extract, transform, and load) tools, client connections with best-in-class business intelligence (BI) reporting, data mining, and analytics tools, and optimizations for very fast execution of complex analytic queries such as those including multi-table joins, sub-queries, and aggregation, more efficiently. Storage service 240 may include various types of database systems and other data store schemes, such as a NoSQL database or various types of relational database systems. In at least some embodiments, updates or other interactions with storage service 240 may be a source for one or multiple data streams for processing by stream processing service 220.

Stream management service 250 may provide programmatic interfaces (e.g., application programming interfaces (APIs), web pages or web sites, graphical user interfaces, or command-line tools) to enable the creation, configuration and deletion of streams. The programmatic interfaces may also enable the submission, storage, analysis, transformation and/or retrieval of streaming data records in some embodiments. Some clients of the stream management system may develop applications that directly invoke the stream management system programmatic interfaces in various embodiments. For example, stream management service 250 may implement a data ingestion system configured to obtain data records of a particular data stream from data producers (e.g., by operating one or multiple ingestion nodes for a data stream). In some embodiments, data records of a stream may be obtained according to a scheme for partitioning the data stream. The partitioning scheme may be selected by a client of stream management service 250 for a data stream such that data records are received from data producer(s) indicating the particular partition to which the data record belongs. However, in some embodiments, a data stream may be fully managed by stream management service 250 and data producer(s) may send data records without any direction for partitioning. Instead, the data ingestion system may assign data records to route the data records to identified partition. Once ingested, stream management service may store obtained data records (e.g., on corresponding storage nodes provisioned for a the data stream). Such storage nodes may record, save, store or otherwise persist the data records on any of various types of storage devices (which may be performed in accordance with a persistence policy for the data stream).

In order to retrieve data from the data stream, stream management service may provide a retrieval system (e.g., implementing retrieval nodes) that may access the stored data records of the data stream. In some embodiments, data retrieval may be performed in response to request from consumers (e.g., stream processing nodes that perform processing on data stream data).

Stream management service 250 may provide an interface that supports one or more sets of programmatic interfaces (e.g., application programming interfaces (APIs), web pages or web sites, graphical user interfaces, or command-line tools) to enable the creation, configuration and deletion of data streams (both client-managed or fully-managed), as well as the submission, storage and retrieval of stream data records in some embodiments. For instance, data producers may be configured to place data records into a data stream by utilizing a client library provided by stream management service 250 to utilize requests, sending a "putRecord" request to stream management service 250 via the interface. Similarly, data consumer(s) may be configured to access stream management service 250 via the interface and utilize the client library provided by stream management service 250 to "getNextRecords" when executing an application to retrieve the next data records to be processed in the data stream.

Other network-based services 260 may include various services, including services configure networking of client provider network resources (e.g., load balancing), security (e.g., firewalls, access control), communication (e.g., notification or messaging systems), event driven execution services, visualization services or services for further data processing. External data stream source(s)/destination(s) 270 may provide data streams which may be processed by stream processing service 220 and/or serve as destinations for the results generated by stream processing service 220. For instance, external data stream sources may be system that collects crowd sourced information (e.g., traffic or temperature) and assembles single data stream of the sourced data for processing to stream processing service 220. External data stream source(s)/destination(s) may be a private data store or processing system which may operate further on results reported from stream processing service 220.

Clients 210 may encompass any type of client configurable to submit requests to network provider 200. For example, a given client 210 may include a suitable version of a web browser, or may include a plug-in module or other type of code module configured to execute as an extension to or within an execution environment provided by a web browser. Alternatively, a client 210 may encompass an application such as a database application (or user interface thereof), a media application, an office application or any other application that may make use of compute instances, a data volume 226, or other network-based service in provider network 200 to perform various operations. In some embodiments, such an application may include sufficient protocol support (e.g., for a suitable version of Hypertext Transfer Protocol (HTTP)) for generating and processing network-based services requests without necessarily implementing full browser support for all types of network-based data. In some embodiments, clients 210 may be configured to generate network-based services requests according to a Representational State Transfer (REST)-style network-based services architecture, a document- or message-based network-based services architecture, or another suitable network-based services architecture. In some embodiments, a client 210 (e.g., a computational client) may be configured to provide access to a compute instance or data volume 226 in a manner that is transparent to applications implement on the client 210 utilizing computational resources provided by the compute instance or block storage provided by the data volume 226.

Clients 210 may convey network-based services requests to provider network 200 via external network 260. In various embodiments, external network 280 may encompass any suitable combination of networking hardware and protocols necessary to establish network-based communications between clients 210 and provider network 200. For example, a network 280 may generally encompass the various telecommunications networks and service providers that collectively implement the Internet. A network 280 may also include private networks such as local area networks (LANs) or wide area networks (WANs) as well as public or private wireless networks. For example, both a given client 210 and provider network 200 may be respectively provisioned within enterprises having their own internal networks. In such an embodiment, a network 280 may include the hardware (e.g., modems, routers, switches, load balancers, proxy servers, etc.) and software (e.g., protocol stacks, accounting software, firewall/security software, etc.) necessary to establish a networking link between given client 210 and the Internet as well as between the Internet and provider network 200. It is noted that in some embodiments, clients 210 may communicate with provider network 200 using a private network rather than the public Internet.

FIG. 3 is a logical block diagram of a stream processing service that implements automated reconfiguration of real time data stream processing, according to at least some embodiments. Managed stream processing service 220 may receive stream processing functions via interface 312 and provision one or more processing nodes 370 from a pool of processing nodes 370 to execute the stream processing function. As illustrated in FIG. 3, managed stream processing service 220 may implement control plane 310 to manage the execution of stream processing functions at stream processing nodes 370.

In various embodiments, control plane 310 may implement interface 312 which may be a programmatic interface invoked by various calls or interactions by clients of managed stream processing service 220. For instance, a client may send a request to create a stream processing application that includes a stream processing function. This request may be formatted according to an API call (e.g., "createStreamProcessor") and may include as parameters of the call one or more operations to perform with respect to the data stream (e.g. query, add, remove, transform, aggregate, calculate, etc.), input data streams (e.g., data stream names, network addresses, or other identification information), and result destinations (e.g., data store names, network addresses or other identification/connection information. Interface 312 may be invoked by a command line interface or may be implemented as part of a graphical user interface. Interface 312 may also provide for the uploading of stream processing functions (e.g., written in a coding language or provided as an executable or other object that may perform stream processing function).

In at least some embodiments, control plane 310 may implement stream processing function interpretation 350. Stream processing interpretation 350 may provide various libraries, compilers, or any other kind of interpreter that may receive a stream processing function (e.g., operations, input data streams, destinations, etc.) and generate an executable form (e.g., object code, byte code, workflow, or other set of instructions). For example, in some embodiments, processing nodes 370 may implement a common execution engine so that stream processing functioning interpretation 350 may provide an executable that can run on any available processing node. In some embodiments, stream processing function interpretation 350 may validate received stream processing functions for errors (e.g., same input and result destination), leaving interpretation and execution to other components, such as execution engines located at processing nodes 370. In various embodiments, stream processing function 350 may evaluate input data streams to determine a data scheme for the execution of a stream processing function. For instance, stream processing function interpretation may access and analyze a group of data records to determine a schema for the data stream, including labeling or identifying common or expected attributes in data records, which may be provided back to a client via interface 312.

In at least some embodiments, control plane 310 may implement a stream processing function library 340 which may provide a collection of common and/or user submitted stream processing functions (or individual operations for stream processing functions). For example, stream processing functions to filter, aggregate, or generate a rolling average may be stored as part of stream processing function library 340. A client may select a stream processing function from the library and adapt or customize it for execution (e.g., supply input data stream information, result destinations, etc.) via interface 312. In this way, stream processing function library 340 may maintain stream processing functions that are common may be easily adapted for different stream processing applications.

Processing node provisioning 330 may be implemented as part of control plane 310, in various embodiments, in order to provision processing nodes for received stream processing functions. In at least some embodiments, processing node provisioning 330 may perform a preliminary analysis to determine the processing requirements or configuration for a stream processing function. If, for instance, multiple data input streams are indicated, then processing node provisioning 330 may determine whether one or multiple processing nodes 370 may need to be acquired in order to execute the stream processing function. If multiples stream processing nodes may be determined, then processing node provisioning 330 may determine a mapping scheme to distribute data amongst the processing nodes 370 and reconstitute or aggregate results from individual processing nodes 370 for reporting. Processing node provisioning may, as noted above, identify required performance characteristics or other stream processing function requirements and obtain and select the appropriate processing nodes.

Once processing nodes 370 are selected, processing node provisioning 330 may configure or obtain the appropriate access credentials to provide the processing nodes 370*a* with access to the input data streams and result destinations. For instance, if security credentials are required, then processing node provisioning may parse information supplied by a client to managed stream processing service when the stream processing function was submitted in order to extract the security credentials for providing process nodes 370 with access. Processing node provisioning 330 may provide the operation(s) and other information to processing nodes 370 in order to initiate execution of the stream processing function (e.g., by providing a SQL statement, executable, or other instructions for applying the stream processing function), which in some embodiments may be generated by stream processing function interpretation 350.

In various embodiments, control plane 310 may implement processing node management 320 to manage the execution of stream processing functions at processing nodes 370. For instance, based on performance metrics received via stream processing function performance monitoring 360, such as metrics that indicate processing utilization, network utilization, memory utilization, or any other computational performance metric, may implement the techniques described above with regard to FIG. 1 and below with regard to FIGS. 8 and 9, in order to reconfigure the execution of processing functions at processing nodes 370 based on collected performance metrics. For instance, performance metrics may indicate that a processing node 370 is unable to keep up with the stream of data records received (e.g., by measuring result output rates, memory utilization, ingress buffers for network packets, etc.). Processing node management 320 may request another processing node 370 from processing node provisioning 330 in order to split the workload for the one processing node among 2 (or more) processing nodes. Various other management functions, such as migrating a stream processing function from process node to another, changing mappings for partitioned data streams, or any other real time changes in configuration to the execution of a stream processing query may be performed by processing node management 320. In some embodiments, clients may submit reconfiguration requests to control plane 310 to change the execution configuration of data streams (e.g., change the number of processing nodes for a stream processing query).

In some embodiments, control plane 310 may implement stream processing function performance monitoring 360. Performance monitoring 360 may be implemented in order to provide feedback to processing node management 320 and/or clients of managed stream processing service 220. For instance, a function performance report, may be generated and sent via interface 312 by performance monitoring 360. In some embodiments, stream processing function performance monitoring may detect reconfiguration events for processing functions and notify processing node management 320 of the detected reconfiguration events.

Figure 4:
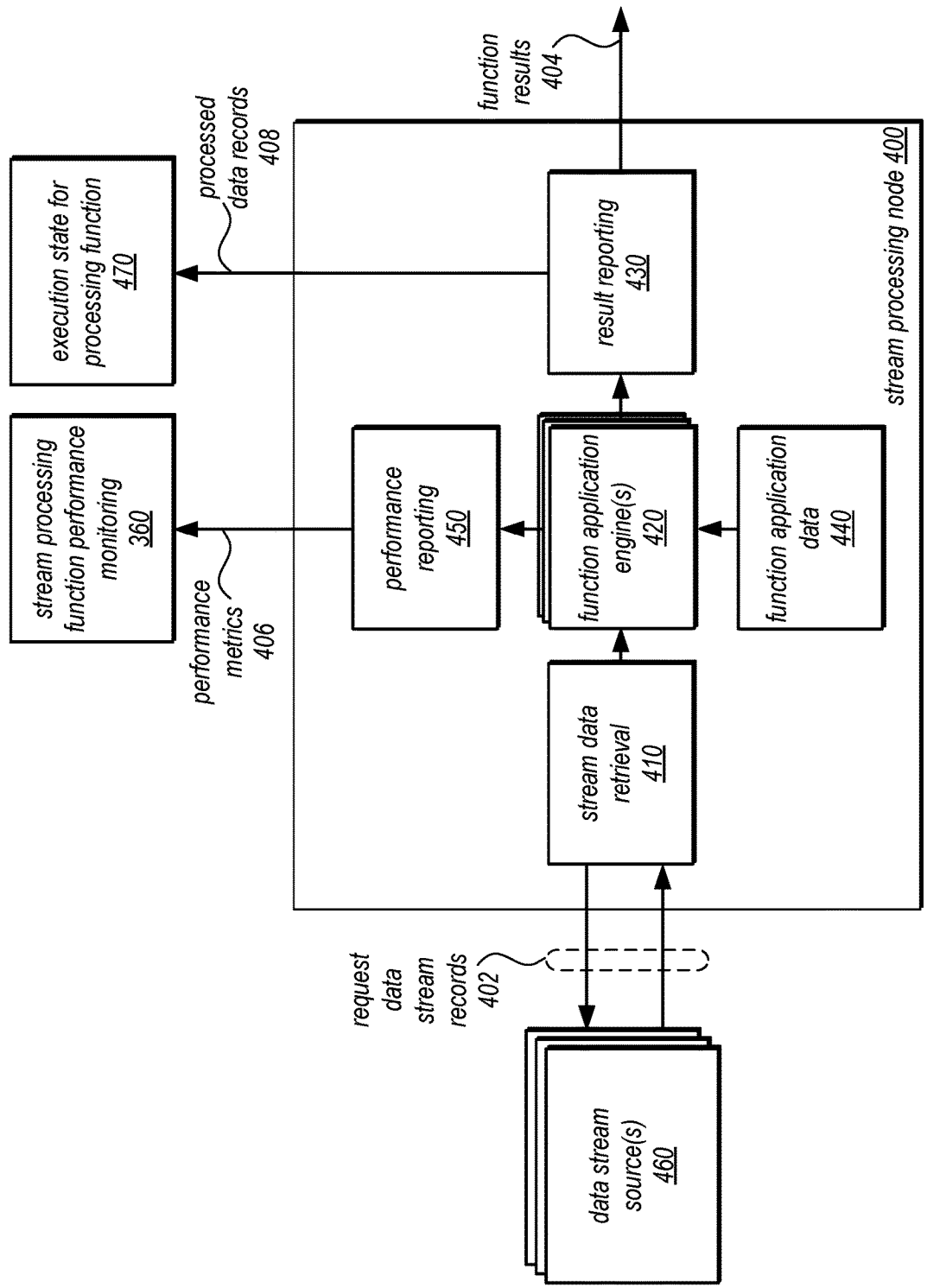
FIG. 4 is a logical block diagram of a stream processing node, according to at least some embodiments.

Managed stream processing service 220 may implement a pool of stream processing nodes 370a through 370n which may be implemented on dedicated hardware hosts (e.g., such as computing system 1000 in FIG. 9 below) or may be implemented as virtual instances (e.g., by provisioning compute instances of computing service 230 in FIG. 2). FIG. 4 is a logical block diagram of a stream processing node, according to at least some embodiments. Stream processing node 400 may retrieve data records for data streams in order to apply a stream processing function (or assigned portion/operation of stream processing function and deliver results generated by applying the stream processing function to a specified destination.

Stream processing node 400 may implement stream data retrieval 410 in order to interface with a data stream source 460. As noted above different types of data stream sources may be implemented. A data stream implemented by a managed stream interface may, for instance, have an interface that allows stream data retrieval to request data stream records 402 individually. Stream data retrieval 410 may periodically request 402 new data records in the stream (e.g., as part of a polling behavior). Throttling, buffer, and other processing rate controls may be implemented by stream data retrieval 410 in order to prevent stream processing node 400 from being overwhelmed. For example, a throttle threshold may be implemented that limits the number data records that may be queued or buffered for processing at stream processing node 400. A timeout or other delay may be performed when the number of data records exceeds the throttle threshold so that stream processing node 400 does not drop or otherwise fail to process the data records received a stream processing node 400. Stream data retrieval 410 may obtain or retrieve data records from data stream sources at different rates. In some embodiments, stream data retrieval 410 may be configured to register and listen for data stream records acting as a network endpoint for data stream source 460 to automatically send data stream records.

Stream processing nodes 400 may implement function application engine(s) 420 to perform the operation(s) of the stream processing function on data records retrieved by stream data retrieval 410. In some embodiments, function application engine(s) 420 may be implemented for a specific scheme or structure of data records. For example, in some embodiments data records may specify data records in a relational format with rows as different data records and columns as different attributes. Function application engine(s) 420 may act as a storage engine (e.g., SQL engine) that applies the specified operations (e.g., select, add, remove, modify, etc.) to data records according to the scheme of the data records. Thus if function application engine(s) 420 where a SQL storage engine, for instance, function application engine(s) 420 would treat a data record as a table and perform the specified operations upon attributes of a data records that mapped to different columns of the table. In some embodiments, function application engine(s) 420 may be execution platform(s) (e.g., for executables, workflows, or other instructions provided by control plane 310) that parses data records, performs the specified operations, and generates the desired results. Note that the previous examples are not intended to be limiting as many different types of function application engine(s) 420 may be implemented to perform specified operations for a stream processing function. In some embodiments, operations may rely upon function specific data, such as function application data 440, to perform operations (e.g., inserting various tags, flags, or other information to enrich a data record). Function application data 440 may be stored locally at stream processing node 400 or may be obtained from a remote data store or service (e.g., from storage service 240 in FIG. 2).

Stream processing node 400 may implement result reporting 430 to direct the sending of results 404 to specified destinations. In some embodiments, multiple destinations for results may be specified. As with stream data retrieval 410, result reporting 430 may utilize different programmatic interfaces to register with and obtain access to the specified destinations. Result reporting 430 may, for example, reformat results 404 into the appropriate request, format, or scheme in order to ensure proper delivery of the reported results 404. Result reporting 430 may buffer results 404 into fewer messages in order to reduce network traffic, in some embodiments. In some embodiments, results may be based on processing function (or operation) state that is updated each time a data records is processed, and only provided at certain times. For instance, a running average state for a window of data records may be updated each time a data record is received, but the running average value may only be provided periodically (e.g., every 30 minutes, 1 hour, etc.) In at least some embodiments, data records that do not conform to the data scheme (e.g., missing attributes or different types of attributes, such as when an attribute value is expected to be a string but is instead an integer), may be stored, directed, or otherwise reported to an error store, for reconciliation with the data stream (e.g., by a user).

Result reporting 430 may track which function results 404 have been successfully delivered (e.g., by waiting for acknowledgements from the specified destinations) and update execution state for processing function 470 with identifications of processed data records 408. For example, result reporting 430 may record a time stamp or data record sequence number that identifies the latest data record to be completely processed (including delivery). As multiple data streams (and/or partitions of data streams) may be processed by stream processing node 400, execution state may be updated to describe processed data records for each data stream (and/or partition), including various information or metadata about the data stream (and/or partition), such as information that maps the execution state with respect to the individual data streams (and/or partitions). For instance, execution state may be updated to include a sequence number for a last data record that is mapped to data stream source A, a sequence number for a last data record that is mapped to data stream source B, and so on.

In at least some embodiments, stream processing node 400 may implement performance reporting 450. Performance reporting 450 may collect utilization, timing, and other performance related statistics for the execution of a stream processing function. Performance reporting 450 may periodically send these performance metrics 406 to stream processing function performance monitoring 360 for the various uses discussed above. In some embodiments, performance reporting 450 may track the performance metrics and provide them upon request from stream processing performance monitoring 360 (so that stream processing function performance monitoring 360 may implement a sweeper style metrics gathering in order to avoid being overwhelmed with metrics reporting across a fleet of stream processing nodes 400).

Figure 5:
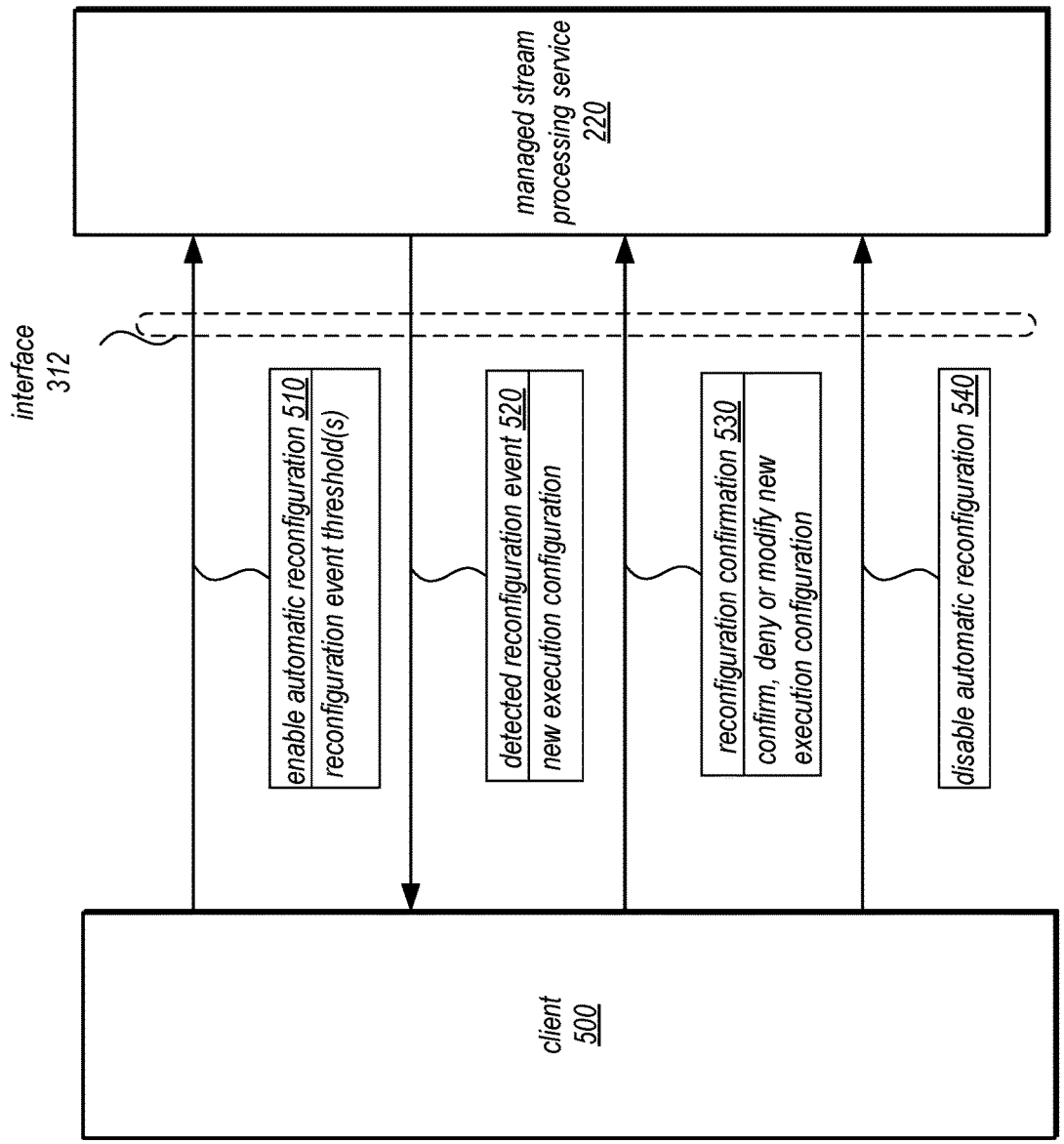
FIG. 5 illustrates interactions between a client and a stream processing service via a programmatic interface, according to at least some embodiments.

FIG. 5 illustrates interactions between a client and a stream processing service via a programmatic interface, according to at least some embodiments. Client 500 (which may be a client 210 in FIG. 2) or other client of managed stream processing service 220 may be configured to access or request actions via interface 312. For instance, a request to enable automatic reconfiguration 510 may be sent via interface 510 to managed stream processing service 220. The request may simply enable the automatic reconfiguration feature (which may not be performed with prior client enablement) or may include reconfiguration event threshold(s) or other reconfiguration event criteria that specifies how reconfiguration events may be triggered. In this way, a client can optimize reconfigurations to maximize different priorities, such as performance, efficiency, or cost.

Managed stream processing service may, in some embodiments, provide notifications of detected reconfiguration events 520 via interface 312 to client 500. For example, the notification may include various metadata describing the event (e.g., detection criteria, operation(s) involved, and/or current execution configuration. In at least some embodiments, a description of a new execution configuration for the processing function may be described (e.g., changes in the number or type of nodes). Client 500 may provide a response 530 that confirms, denies, or modifies the new execution configuration (e.g., changing node types to reduce cost or increase performance). As illustrated in FIG. 5, client 500 may also send a request 540 to disable automatic reconfiguration.

Figure 6A:
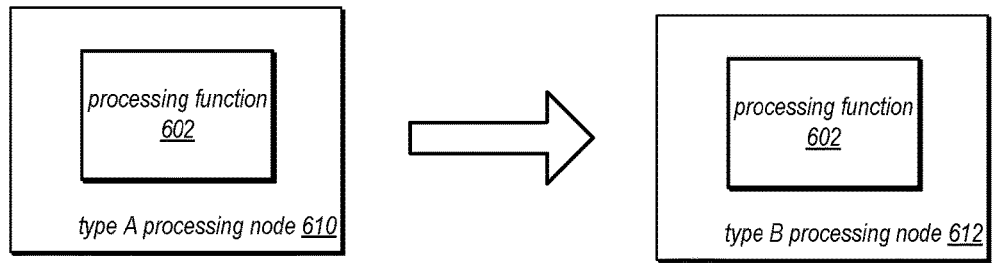
FIGS. 6A-6C illustrate different reconfigurations that may be performed in response to detecting a reconfiguration event, according to at least some embodiments.

FIG. 6A illustrates an example change in the execution configuration of a processing function. Processing function 602 may be applied at type A processing node 610. A detected reconfiguration event for processing function 602 may indicate that a different type of processing node should be utilized to apply the processing function. Thus, as the changed execution configuration to the right of the arrow indicates that a different type of processing node has been substituted, type B processing node 612 (in place of type A processing node). As many different types of processing nodes can be employed to apply processing functions, such a change in execution configuration may be widely applicable to resolve many different performance concerns identified by a reconfiguration event.

Figure 6B:
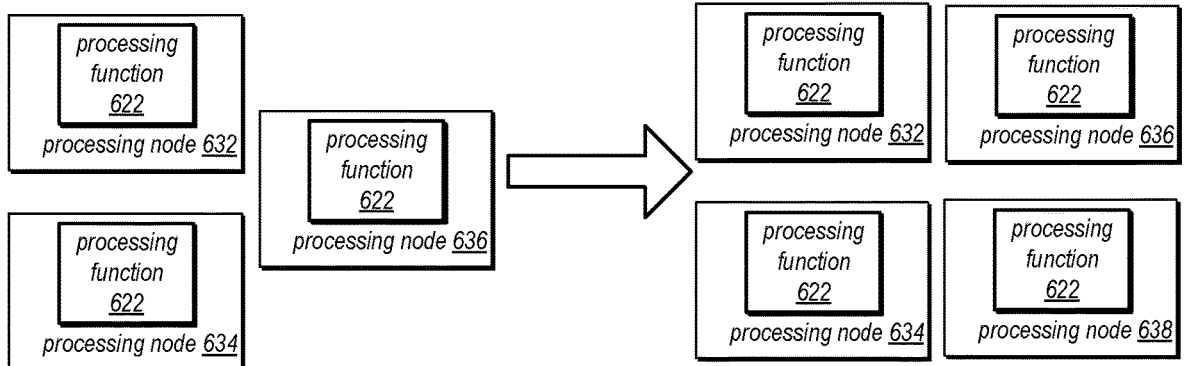

FIG. 6B illustrates another example change in the execution configuration of a processing function. A group of processing nodes, processing nodes 632, 634, and 636 may be implemented to applying processing function 622 in parallel. A detected reconfiguration event for processing function 622 may indicate that a different number of processing nodes should be utilized to apply the processing function. Thus, as the changed execution configuration to the right of the arrow indicates, an additional node is added to the group of nodes, processing node 638 which also applies processing function 622. Mapping information which directs different data records (e.g., from different data streams or partitions of a data stream) to different processing nodes may be updated to redistribute data records to include processing node 638. Note that in various embodiments, processing nodes may be added or removed (not illustrated), and as such, a change in the number of nodes determined as part of a new execution configuration may be widely applicable to resolve many different performance concerns identified by a reconfiguration event.

Figure 6C:
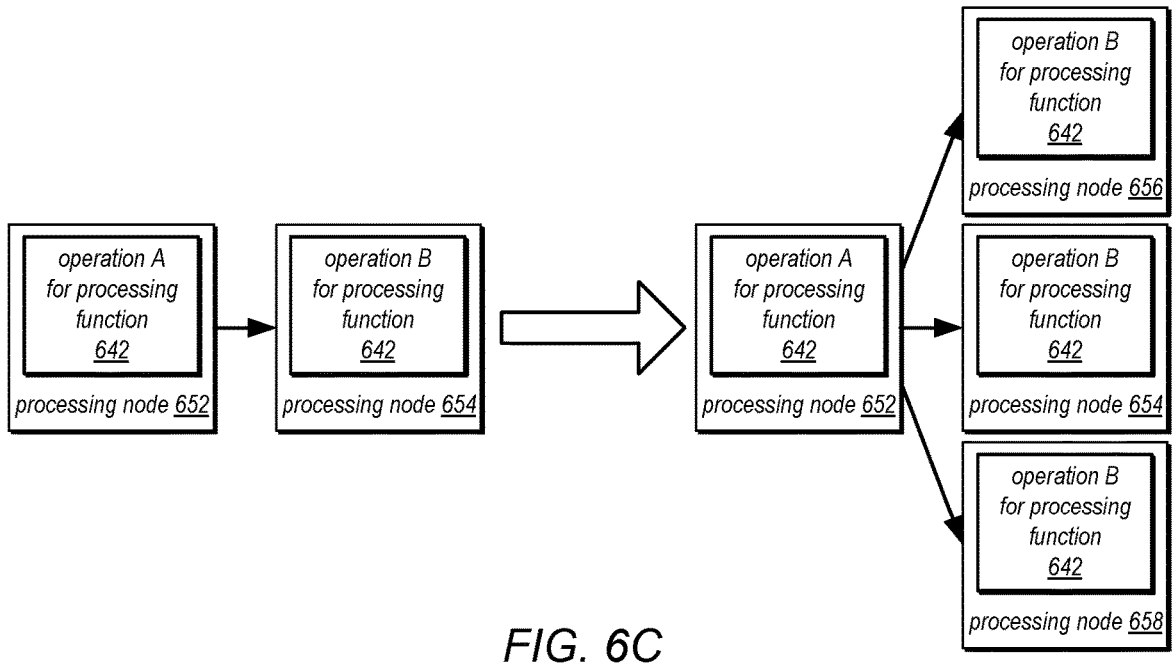

FIG. 6C illustrates another example change in the execution configuration of a processing function. A group of processing nodes, processing nodes 652 and 654 may be implemented to different operations in parallel (e.g., operation A for processing function 642 and operation B for processing function 642 respectively). However, a detected reconfiguration event for processing function 642 may indicate that a different number of processing nodes should be utilized to apply operation B for processing function 642 (e.g., as operation B may be a much more time consuming or resource intensive operation than operation A which may be outputting data faster than operation B can cope with). Thus, as the changed execution configuration to the right of the arrow indicates, additional nodes may be added to the group of nodes, processing nodes 656 and 658 which also applies operation B for processing function 642. As with FIG. 6B, note that in various embodiments, processing nodes may be added or removed (not illustrated) for performing specific operations, and as such, a change in the number of nodes performing specific operations determined as part of a new execution configuration may be widely applicable to resolve many different performance concerns identified by a reconfiguration event. Although not illustrated in FIG. 6C, a further operation may be added to recombine or aggregate the results of processing nodes 654, 656, and 658 into a single set of results that may be transmitted, in some embodiments.

The examples of automated reconfiguration of real time data stream processing as discussed above with regard to FIGS. 2-6C have been given in regard to a stream processing service and/or other network-based services. Various other types or configurations of distributed systems processing data from a data stream may implement these techniques. For example, large-scale distributed environments operated by a single business entity may implement managed function execution and automated reconfiguration for processing data streams in real time for its own applications. Moreover, different configurations of the various modules, components, systems, and or services described above that may implement automated reconfiguration of real time data stream processing. Thus the stream management service discussed above serves as one example context in which many of the stream management and processing techniques described herein may be implemented. However, the techniques discussed below with regard to FIGS. 7 and 8 may be also implemented using the managed stream processing service as discussed above.

Figure 7:
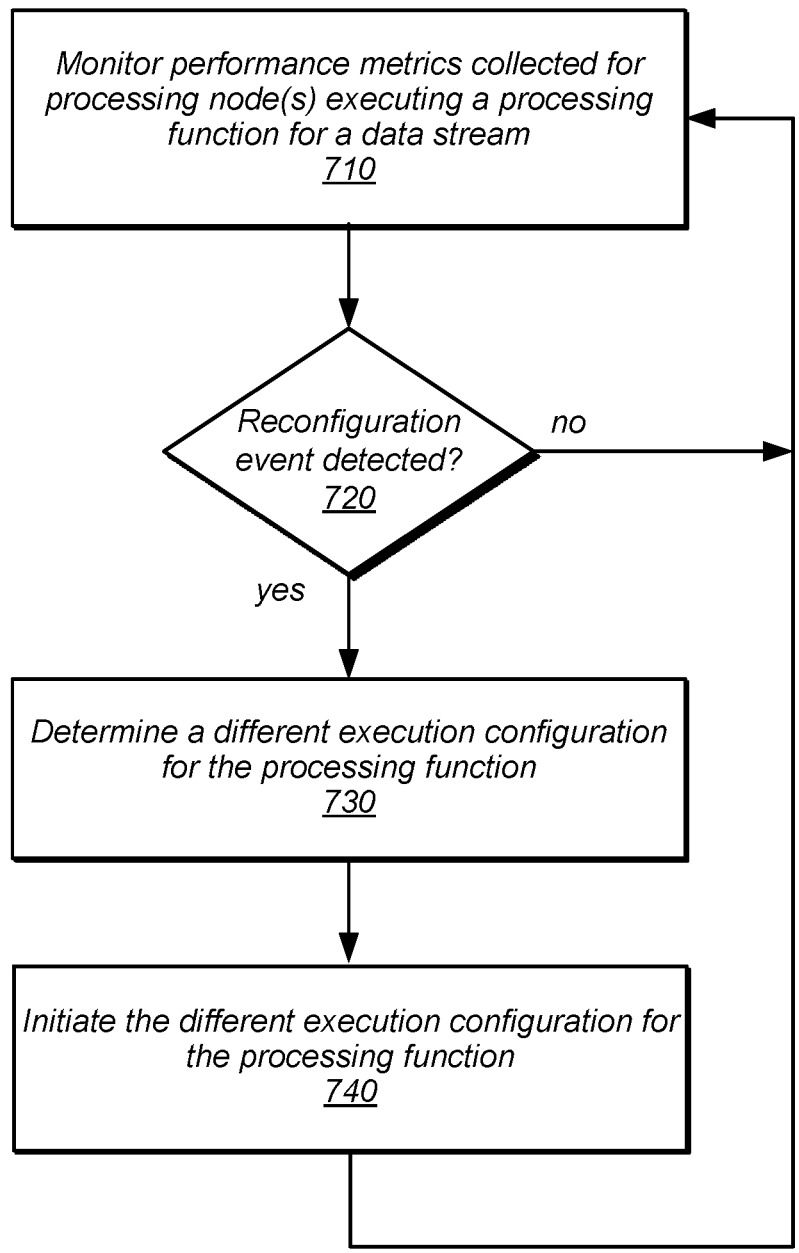
FIG. 7 is a high-level flowchart illustrating various methods and techniques to provide automated reconfiguration of real time data stream processing, according to at least some embodiments.

FIG. 7 is a high-level flowchart illustrating various methods and techniques to provide automated reconfiguration of real time data stream processing, according to at least some embodiments. As noted above processing function may be executed on one or multiple stream processing nodes to perform various operations (e.g., operations to filter, aggregate, modify, transform, separate, or otherwise manipulate data records, including various analytical statistics which can be calculated or tracked for the data stream over time) upon data records of one or more data streams. The processing function may generate different results which may be sent to result destination(s) (e.g., providing data objects, data stores, network addresses, access information/credentials, data formats, multiple destinations, etc.). As the data records are received as part of a data stream, the processing function may be applied in streaming fashion, as data records are received at the processing nodes.

Different performance metrics (e.g., metrics that indicate processor utilization, network utilization, memory utilization, or any other computational performance metric for processing nodes or hosts upon which the nodes are implement, metrics that indicate the behavior of the data stream, rate of data records received, average size of data records, number of data records in processing buffer or queue, or metrics that are specific to the performance of individual operations such as average time to perform a query operation, filter operation, aggregation operation, statistical analysis, etc.). These performance metrics may be reported by processing nodes (e.g., in response to requests for metrics or automatically). As indicated at 710, the performance metrics that are collected may be monitored in order to detect a reconfiguration event for the data stream.

A reconfiguration event, as noted above, may be detected when the performance of the processing function (including individual operations within the processing function) and/or processing nodes applying the processing function satisfy reconfiguration event trigger criteria. Reconfiguration event trigger criteria may be specified as thresholds, ranges, anomaly models, or any other conditions that may be determined based on the collected performance metrics. For example, a modeling operation that calculates a running average distribution of attribute values may trigger a reconfiguration event in the event that memory utilization on behalf of generating and maintaining the running average distribution exceeds a memory utilization threshold. In some embodiments, reconfiguration event criteria may be specified by a client. However, in some embodiments, reconfiguration event criteria may be determined by a stream processing system. Reconfiguration event criteria may be configured to optimize the performance of reconfiguration for different priorities, efficient resource utilization, cost (e.g., for service models where the number of nodes or type of nodes drives the cost of the nodes), or any other operational priority.

As indicated by the positive exit from 720, when a reconfiguration event is detected, reconfiguring of the execution of the processing function may be performed. For example, as indicated at 730, a different execution configuration may be determined for the processing function, in at least some embodiments. The execution configuration may include the number of processing nodes executing the processing function, the distribution operations of the processing function amongst processing node(s), the types of processing node(s) (e.g., number of processors, bandwidth of network connection, amount of memory, local persistent storage, etc.), increasing the number of nodes performing an operation (e.g., increasing parallelism) or the mapping of data records of the data stream(s) to different process node(s). Consider the example given above, a different execution configuration that may be determined for the processing node performing the running average distribution may include dividing the work of the operation amongst multiple nodes (e.g., increasing parallelization) or changing the processing node to a different type of processing node with a greater amount of memory available for performing the operation. In at least some embodiments, the different execution configuration may include at least one node that is different than the processing node(s) currently executing the processing function.

As indicated at 740, the different execution configuration may be initiated for the processing function. In at least some embodiments, the additional or different nodes may be provisioned (e.g., by sending a request to a virtual computing resource service for different compute instances or allocating different dedicated processing node hosts from a pool of processing node hosts to satisfy the different execution configuration (e.g., different node types, additional nodes, etc.). In some embodiments, processing of the data stream records may be suspended upon occurrence of the reconfiguration event so that various changes to update current processing nodes in accordance with the different execution configuration (e.g., changes to operations performed or changes to data stream record mapping). For those nodes that are no longer being utilized in the different execution configuration, the processing nodes may be shutdown, frozen, or otherwise released for performing other operations for other data streams. In some embodiments, a reboot migration operation may be performed to seamless transition the work being performed by one processing node to another by shutting down a current node and booting up a different node that is configured to perform the same operation (e.g., perhaps with different capabilities, such as greater processor speed, memory, or storage). In at least some embodiments, the processing nodes may be continually updating execution state for the processing function so that upon resumption of operations, the last processed data record may be used as the starting point for processing subsequent data records in the data stream(s).

Figure 8:
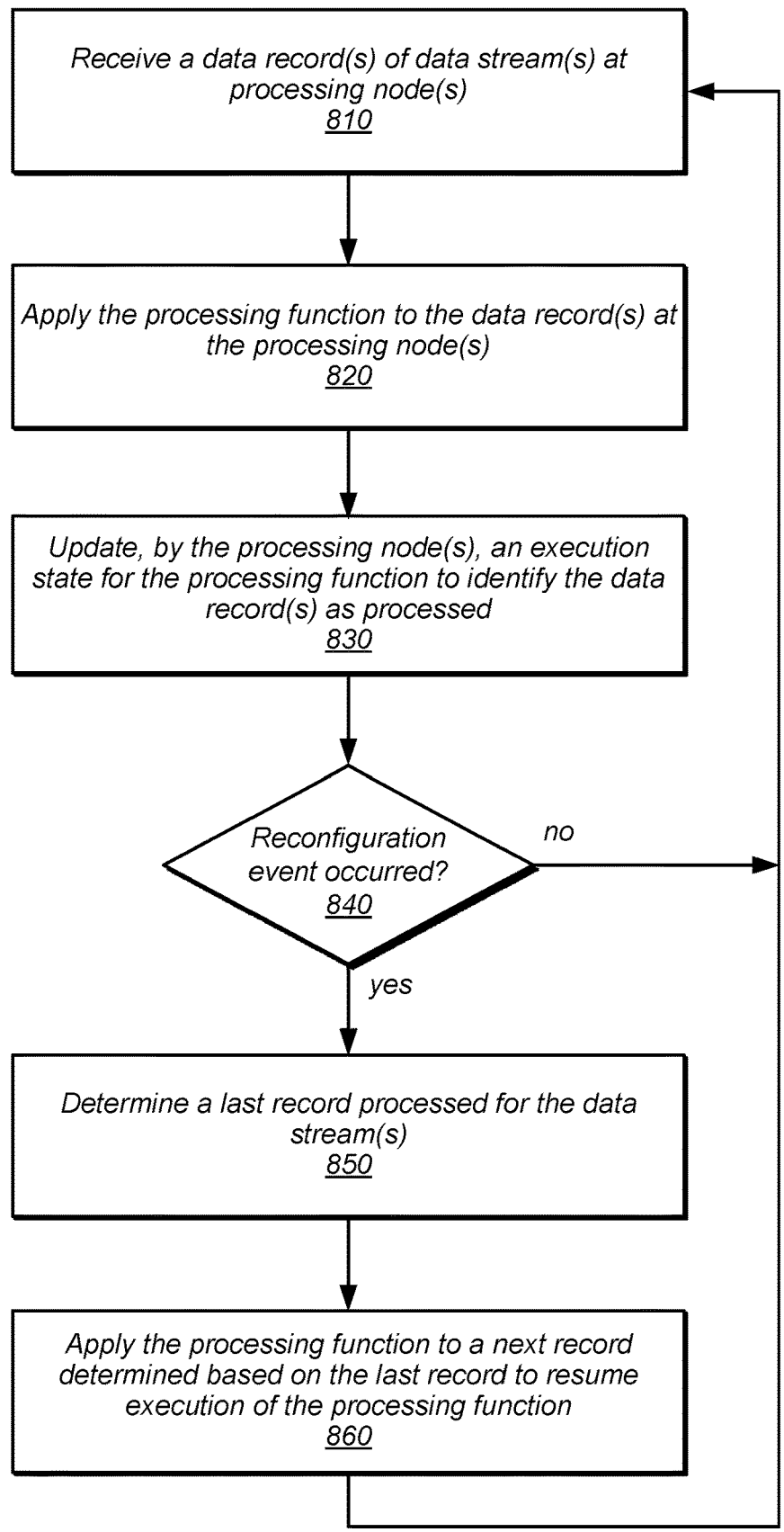
FIG. 8 is a high-level flowchart illustrating various methods and techniques to update execution state for a stream processing function in order to resume stream processing upon a reconfiguration event, according to at least some embodiments.

FIG. 8 is a high-level flowchart illustrating various methods and techniques to update execution state for a stream processing function in order to resume stream processing upon a reconfiguration event, according to at least some embodiments. As indicated at 810, data records of data stream(s) being processed according to a stream processing function may be received at processing node(s), in some embodiments. In some embodiments, results of the operations may be transmitted to specified destinations, as discussed above. The processing node(s) may apply the processing function to the data record(s), as indicated at 820 (performing various operation(s) according to a current execution configuration). Upon completing the processing of the data records, an execution state for the processing function may be update to identify the data records as processed, as indicated at 830. For example, a data record identifier (e.g., a sequence number or timestamp may be recorded as the latest data record to be processed). The execution state may be separately and/or durably stored from a processing node that updates the execution state. As noted above, data records may be processed from multiple different data streams (and/or partitions of data streams), and the execution state of the processing function may reflect the data records processed for each of the different data streams (and/or partitions thereof). Updating may continue until the detection of a reconfiguration event after which processing of data records may be paused or halted.

As indicated by the positive exit from 840, if a reconfiguration event is detected, then the execution state for the processing function may be accessed to determine a last record processed for the data stream(s), as indicated at 850. For example, the highest sequence number or latest time stamp may be read from execution state, indicating that all data records prior to the sequence number or time stamp have been processed. Similar determinations may be performed for each data stream and/or partition of a data stream in those scenarios where multiple data streams are being processed by the same processing function. Once the last record processed for the data stream(s) is determined, then processing may be able resume at a processing node(s) performing according to a new execution configuration for the processing function, applying the processing function from the last record processed in the data stream (and/or last records for the multiple data streams and/or partitions thereof) before obtaining new data records for processing, as indicated at 860. In this way, the processing function may be assured of its application to each data record in the data stream, even those data records that may be received close in time to a reconfiguration event. For those data records received, but not processed, or processed but not recorded as processed in the execution state, the applying function may be applied again in order to ensure that such data records are processed.

The techniques described above may be useful in a number of scenarios. For example, large provider networks may comprise thousands of instance hosts implementing service instances of a number of different multi-tenant or single-tenant services for tens of thousands of clients simultaneously. Monitoring and/or billing agents installed on the various instances and hosts may rapidly generate thousands of metric records, which may need to be stored and analyzed to produce accurate billing records, to determine effective provisioning plans for the data centers of the provider network, to detect network attacks, and the like. The monitoring records may form an input stream to a managed stream processing service so that the techniques described may be implemented for the analysis of the collected records. Similarly, applications to collect and analyze large numbers of log records from numerous log sources (e.g., application logs from the nodes of a distributed application, or system logs from the hosts or compute instances at a data center) may also be able to utilize managed stream processing services. In at least some environments, the processing operations for data records may comprise a real-time ETL (Extract-Transform-Load) processing operation (i.e., an operation that transforms received data records in real time for loading into a destination, instead of doing the transformation offline), or a transformation of data records for insertion into a data warehouse. Using a data stream for loading data into a data warehouse in real time may avoid the delays that are typically required to clean and curate data from one or more data sources, before the data can be inserted into a warehouse for analysis.

A number of different "big data" applications may also be built using the SMS and processing techniques. For example, the analysis of trends in various forms of social media interactions may be performed efficiently using streams. Data collected from mobile phones or tablet computers, such as location information of the users, may be managed as stream records. Audio or video information, collected for example from a fleet of monitoring cameras may represent another category of streaming data set that could be collected and processed in a scalable manner, potentially helping prevent attacks of various kinds. Scientific applications that require analysis of ever-growing data sets, collected for example from weather satellites, ocean-based sensors, forest-based sensors, astronomical telescopes, may also benefit from the stream management and processing capabilities described herein.

The methods described herein may in various embodiments be implemented by any combination of hardware and software. For example, in one embodiment, the methods may be implemented by a computer system (e.g., a computer system as in FIG. 9) that includes one or more processors executing program instructions stored on a computer-readable storage medium coupled to the processors. The program instructions may be configured to implement the functionality described herein (e.g., the functionality of various servers, resource hosts, control planes, managers and/or other components, such as those that implement the block-based storage service described herein). The various methods as illustrated in the figures and described herein represent example embodiments of methods. The order of any method may be changed, and various elements may be added, reordered, combined, omitted, modified, etc.

Figure 9:
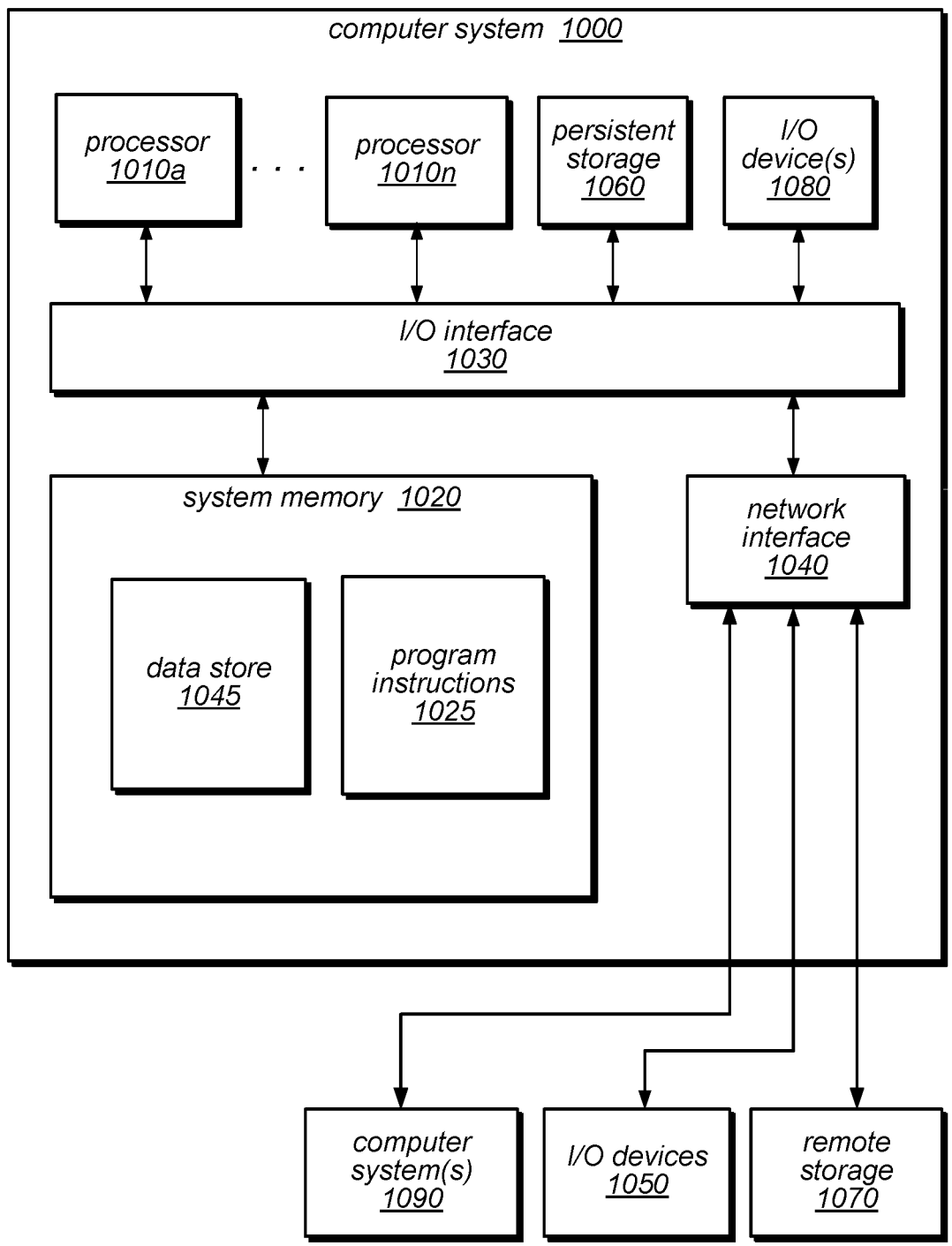
FIG. 9 is a block diagram illustrating an example computing system that may be used in at least some embodiments.

Embodiments of automated reconfiguration of real data stream processing as described herein may be executed on one or more computer systems, which may interact with various other devices. FIG. 9 is a block diagram illustrating an example computer system, according to various embodiments. For example, computer system 1000 may be configured to implement storage and/or compute nodes of a compute cluster, a data stores, and/or a client, in different embodiments. Computer system 1000 may be any of various types of devices, including, but not limited to, a personal computer system, desktop computer, laptop or notebook computer, mainframe computer system, handheld computer, workstation, network computer, a consumer device, application server, storage device, telephone, mobile telephone, or in general any type of computing device.

Computer system 1000 includes one or more processors 1010 (any of which may include multiple cores, which may be single or multi-threaded) coupled to a system memory 1020 via an input/output (I/O) interface 1030. Computer system 1000 further includes a network interface 1040 coupled to I/O interface 1030. In various embodiments, computer system 1000 may be a uniprocessor system including one processor 1010, or a multiprocessor system including several processors 1010 (e.g., two, four, eight, or another suitable number). Processors 1010 may be any suitable processors capable of executing instructions. For example, in various embodiments, processors 1010 may be general-purpose or embedded processors implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA. The computer system 1000 also includes one or more network communication devices (e.g., network interface 1040) for communicating with other systems and/or components over a communications network (e.g. Internet, LAN, etc.).

In the illustrated embodiment, computer system 1000 also includes one or more persistent storage devices 1060 and/or one or more I/O devices 1080. In various embodiments, persistent storage devices 1060 may correspond to disk drives, tape drives, solid state memory, other mass storage devices, block-based storage devices, or any other persistent storage device. Computer system 1000 (or a distributed application or operating system operating thereon) may store instructions and/or data in persistent storage devices 1060, as desired, and may retrieve the stored instruction and/or data as needed. For example, in some embodiments, computer system 1000 may host a storage system server node, and persistent storage 1060 may include the SSDs attached to that server node.

Computer system 1000 includes one or more system memories 1020 that are configured to store instructions and data accessible by processor(s) 1010. In various embodiments, system memories 1020 may be implemented using any suitable memory technology, (e.g., one or more of cache, static random access memory (SRAM), DRAM, RDRAM, EDO RAM, DDR 10 RAM, synchronous dynamic RAM (SDRAM), Rambus RAM, EEPROM, non-volatile/Flash-type memory, or any other type of memory). System memory 1020 may contain program instructions 1025 that are executable by processor(s) 1010 to implement the methods and techniques described herein. In various embodiments, program instructions 1025 may be encoded in platform native binary, any interpreted language such as Java™ byte-code, or in any other language such as C/C++, Java™, etc., or in any combination thereof. For example, in the illustrated embodiment, program instructions 1025 include program instructions executable to implement the functionality of a resource host, in different embodiments. In some embodiments, program instructions 1025 may implement multiple separate clients, nodes, and/or other components.

In some embodiments, program instructions 1025 may include instructions executable to implement an operating system (not shown), which may be any of various operating systems, such as UNIX, LINUX, Solaris™, MacOS™, Windows™, etc. Any or all of program instructions 1025 may be provided as a computer program product, or software, that may include a non-transitory computer-readable storage medium having stored thereon instructions, which may be used to program a computer system (or other electronic devices) to perform a process according to various embodiments. A non-transitory computer-readable storage medium may include any mechanism for storing information in a form (e.g., software, processing application) readable by a machine (e.g., a computer). Generally speaking, a non-transitory computer-accessible medium may include computer-readable storage media or memory media such as magnetic or optical media, e.g., disk or DVD/CD-ROM coupled to computer system 1000 via I/O interface 1030. A non-transitory computer-readable storage medium may also include any volatile or non-volatile media such as RAM (e.g. SDRAM, DDR SDRAM, RDRAM, SRAM, etc.), ROM, etc., that may be included in some embodiments of computer system 1000 as system memory 1020 or another type of memory. In other embodiments, program instructions may be communicated using optical, acoustical or other form of propagated signal (e.g., carrier waves, infrared signals, digital signals, etc.) conveyed via a communication medium such as a network and/or a wireless link, such as may be implemented via network interface 1040.

In some embodiments, system memory 1020 may include data store 1045, which may be configured as described herein. In general, system memory 1020 (e.g., data store 1045 within system memory 1020), persistent storage 1060, and/or remote storage 1070 may store data blocks, replicas of data blocks, metadata associated with data blocks and/or their state, configuration information, and/or any other information usable in implementing the methods and techniques described herein.

In one embodiment, I/O interface 1030 may be configured to coordinate I/O traffic between processor 1010, system memory 1020 and any peripheral devices in the system, including through network interface 1040 or other peripheral interfaces. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. Also, in some embodiments, some or all of the functionality of I/O interface 1030, such as an interface to system memory 1020, may be incorporated directly into processor 1010.

Network interface 1040 may be configured to allow data to be exchanged between computer system 1000 and other devices attached to a network, such as other computer systems 1090, for example. In addition, network interface 1040 may be configured to allow communication between computer system 1000 and various I/O devices 1050 and/or remote storage 1070. Input/output devices 1050 may, in some embodiments, include one or more display terminals, keyboards, keypads, touchpads, scanning devices, voice or optical recognition devices, or any other devices suitable for entering or retrieving data by one or more computer systems 1000. Multiple input/output devices 1050 may be present in computer system 1000 or may be distributed on various nodes of a distributed system that includes computer system 1000. In some embodiments, similar input/output devices may be separate from computer system 1000 and may interact with one or more nodes of a distributed system that includes computer system 1000 through a wired or wireless connection, such as over network interface 1040. Network interface 1040 may commonly support one or more wireless networking protocols (e.g., Wi-Fi/IEEE 802.11, or another wireless networking standard). However, in various embodiments, network interface 1040 may support communication via any suitable wired or wireless general data networks, such as other types of Ethernet networks, for example. Additionally, network interface 1040 may support communication via telecommunications/telephony networks such as analog voice networks or digital fiber communications networks, via storage area networks such as Fibre Channel SANs, or via any other suitable type of network and/or protocol. In various embodiments, computer system 1000 may include more, fewer, or different components than those illustrated in FIG. 9 (e.g., displays, video cards, audio cards, peripheral devices, other network interfaces such as an ATM interface, an Ethernet interface, a Frame Relay interface, etc.)

It is noted that any of the distributed system embodiments described herein, or any of their components, may be implemented as one or more network-based services. For example, a compute cluster within a computing service may present computing and/or storage services and/or other types of services that employ the distributed computing systems described herein to clients as network-based services. In some embodiments, a network-based service may be implemented by a software and/or hardware system designed to support interoperable machine-to-machine interaction over a network. A network-based service may have an interface described in a machine-processable format, such as the Web Services Description Language (WSDL). Other systems may interact with the network-based service in a manner prescribed by the description of the network-based service's interface. For example, the network-based service may define various operations that other systems may invoke, and may define a particular application programming interface (API) to which other systems may be expected to conform when requesting the various operations. though In various embodiments, a network-based service may be requested or invoked through the use of a message that includes parameters and/or data associated with the network-based services request. Such a message may be formatted according to a particular markup language such as Extensible Markup Language (XML), and/or may be encapsulated using a protocol such as Simple Object Access Protocol (SOAP). To perform a network-based services request, a network-based services client may assemble a message including the request and convey the message to an addressable endpoint (e.g., a Uniform Resource Locator (URL)) corresponding to the network-based service, using an Internet-based application layer transfer protocol such as Hypertext Transfer Protocol (HTTP).

In some embodiments, network-based services may be implemented using Representational State Transfer ("RESTful") techniques rather than message-based techniques. For example, a network-based service implemented according to a RESTful technique may be invoked through parameters included within an HTTP method such as PUT, GET, or DELETE, rather than encapsulated within a SOAP message.

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A system, comprising:
a plurality of compute nodes, respectively comprising at least one processor and a memory, wherein the plurality of compute nodes implement a managed stream processing system comprising a control plane and a plurality of stream processing nodes;
the control plane, configured to:
collect performance metrics for one or more of the processing nodes that execute a processing function for a data stream that applies the processing function to data records of the data stream as they are received;
based, at least in part, on an analysis of the performance metrics, detect a reconfiguration event for the processing function as the one or more of the processing nodes continue to execute the processing function for the data stream;
in response to the detection of the reconfiguration event:
determine a different execution configuration for the processing function such that at least one different processing node is executing the processing function;
initiate the different execution configuration for the processing function; and
the plurality of stream processing nodes configured to:
execute the processing function using the different execution configuration for the processing function.

2. The system of claim 1, wherein the control plane is further configured to perform the initiation of the different execution configuration in further response to receipt of a confirmation indication from a client of the managed stream processing system.

3. The system of claim 1, wherein the processing function processes one or more different data streams in addition to the data stream, wherein the one or more processing nodes are configured to update an execution state in a durable data store for the processing function as the processing function is applied to data records of the data stream and the one or more different data streams, and wherein to initiate the different execution configuration for the processing function, the control plane is configured to determine respective last processed data records for the data stream and the one or more different data streams such that execution of the processing function resumes from the respective last processed data records of the data stream and the one or more different data streams.

4. The system of claim 1, wherein the managed stream processing system is a network based service implemented as part of a provider network and wherein the one or more processing nodes are implemented as virtual computing resources hosted by a virtual computing service implemented as part of the provider network.

5. A method, comprising:
performing, by one or more computing devices:
evaluating one or more performance metrics describing one or more processing nodes executing a processing function for a data stream that applies the processing function to data records of the data stream as they are received;
based, at least in part, on the evaluating, detecting an event to reconfigure the execution of the processing function as the one or more processing nodes continue to execute the processing function for the data stream;
in response to detecting the event, reconfiguring the execution of the processing function to reallocate execution of the processing function to include at least one different processing node.

6. The method of claim 5, further comprising requesting, from the one or more processing nodes, the one or more performance metrics describing the one or more processing nodes executing the processing function for the data stream.

7. The method of claim 5, wherein the evaluating the one or more performance metrics and the detecting the event are performed in response to receiving a request to enable automatic reconfiguration for the execution of the processing function from a client via a programmatic interface.

8. The method of claim 7, wherein the request to enable automatic reconfiguration comprises a reconfiguration event threshold and wherein detecting the event for the processing function comprises determining that the one or more performance metrics exceed the reconfiguration event threshold.

9. The method of claim 5, wherein the at least one different processing node is a different type of processing node than the one or more processing nodes, and wherein reconfiguring the execution of the processing function comprises selecting the different type of processing node for the execution of the processing function based, at least in part, on the one or more performance metrics.

10. The method of claim 5, wherein reconfiguring the execution of the processing function comprises at least one of:
adding one or more additional processing nodes including the at least one different node; or
removing at least one of the one or more processing nodes.

11. The method of claim 5, wherein the data stream is one of a plurality of data streams upon which the processing function is executing, and wherein reconfiguring the execution of the processing function comprises determining a different data stream mapping for applying the processing function at a plurality of processing nodes including the at least one different processing node to reallocate processing of the plurality of data streams.

12. The method of claim 5,
wherein the method further comprises updating, by the one or more processing nodes, an execution state for the processing function as the processing function is applied to the data records of the data stream; and
wherein reconfiguring the execution of the processing function comprises determining a last processed data record of the data stream such that the at least one different processing node resumes application of the processing function from the last processed data record in the data stream.

13. The method of claim 12, wherein the processing function executes upon one or more other data streams in addition to the data stream, wherein updating the execution state for the processing function further comprises updating the execution state as other data records from the one or more other data streams are processed, and wherein reconfiguring the execution of the processing function further comprises determining respective last processed data records for the one or more other data streams so that execution of the processing function resumes from the respective last processed data records for the one or more data streams.

14. A non-transitory, computer-readable storage medium, storing program instructions that when executed by one or more computing devices cause the one or more computing devices to implement:
monitoring performance metrics collected for one or more processing nodes executing a processing function for a data stream that applies the processing function to data records of the data stream as they are received;
based, at least in part, on the monitoring, detecting a reconfiguration event for the processing function as the one or more processing nodes continue to execute the processing function for the data stream;
in response to detecting the reconfiguration event:
determining a different execution configuration for the processing function that reallocates execution of the processing function for least one processing node; and
initiating the different execution configuration for the processing function.

15. The non-transitory, computer-readable storage medium of claim 14, wherein the program instructions cause the one or more computing devices to implement performing the initiating the different execution configuration for the processing function in further response to receiving a confirmation of the different execution configuration from a client via a programmatic interface.

16. The non-transitory, computer-readable storage medium of claim 14, wherein monitoring the performance metrics and detecting the reconfiguration event are performed in response to receiving a request to enable automatic reconfiguration for the execution of the processing function from a client via a programmatic interface.

17. The non-transitory, computer-readable storage medium of claim 16, wherein in response to receiving a request to disable automatic reconfiguration for the execution of the processing function from the client via the programmatic interface, the program instructions cause the one or more computing devices to implement halting the monitoring of the performance metrics.

18. The non-transitory, computer-readable storage medium of claim 14,
wherein the program instructions cause the one or more computing devices to further implement updating, by the one or more processing nodes, an execution state for the processing function as the processing function is applied to the data records of the data stream; and
wherein, in reconfiguring the execution of the processing function, the program instructions cause the one or more computing devices to implement determining a last processed data record of the data stream such that the at least one different processing node resumes application of the processing function from the last processed data record in the data stream.

19. The non-transitory, computer-readable storage medium of claim 14, wherein the processing function comprises a plurality of operations performed at different ones of the one or more processing nodes, and wherein in determining the different execution configuration for the processing function the program instructions cause the one or more computing devices to implement configuring the at least one processing node to perform one of the operations to increase a number of processing nodes performing the operation.

20. The non-transitory, computer-readable storage medium of claim 14, wherein the managed stream processing system is a network based service implemented as part of a provider network and wherein the data stream is produced by another network-based service implemented as part of the provider network.

* * * * *